United States Patent [19]
Frey

[11] 3,816,778

[45] June 11, 1974

[54] MOUNTING FOR MECHANICAL VIBRATOR

[75] Inventor: LaVerne L. Frey, Delavan, Wis.

[73] Assignee: Bunker Ramo Corporation, Oak Brook, Ill.

[22] Filed: June 23, 1972

[21] Appl. No.: 265,443

[52] U.S. Cl. .................... 310/25, 58/23 TF, 84/409
[51] Int. Cl. .......................................... H02k 33/00
[58] Field of Search ............ 310/25, 21, 22; 84/409, 84/457; 58/23 TF; 331/156

[56] References Cited

UNITED STATES PATENTS

| | | | |
|---|---|---|---|
| 1,166,317 | 12/1915 | Berry | 84/409 |
| 2,556,342 | 6/1951 | Sebouh | 84/457 X |

*Primary Examiner*—D. F. Duggan
*Attorney, Agent, or Firm*—D. R. Bair; F. M. Arbuckle

[57] ABSTRACT

Base of a planar type vibrator is attached to a mounting surface by a tension member extending through the base of the vibrator, controlling it against rotation around the tension member, and holding the base against a curved surface of an interposed elastomeric pad with a controlled degree of compression of the pad.

8 Claims, 4 Drawing Figures

MOUNTING FOR MECHANICAL VIBRATOR

BACKGROUND OF THE INVENTION

The present invention relates to improvements in mounting means for mechanical vibrators, and more particularly to mounting means useful for isolation of the vibrator from external shocks and random vibration.

In many electronic and electromechanical systems and devices there is a need for a highly stable source of electrical signals at some predetermined frequency. In some instances the desired frequency is relatively low and it becomes difficult to produce a low cost highly reliable all-electronic oscillator circuit, suitable for powering a signal frequency dependent electromechanical clock or the like.

As shown in U.S. Pat. No. 3,636,810, a flat or planar mechanical vibrator can be used as the frequency controlling element in an electromechanical oscillator, suitable for operating a signal frequency dependent electromechanical clock. The small size of such an oscillator system and its manufacturing economy make it particularly advantageous, for example, for use in an automobile clock, but such usage exposes the mechanical vibrator to the vibrations and random shocks which automobile instruments inevitably experience, and some means of isolating the vibrator from those factors in the environment is highly desirable.

It is accordingly an object of the present invention to provide a mounting means for such a vibrator which, in an economical manner, meets the need for a substantial degree of isolation from external shock and vibration which might otherwise affect the operating frequency of the vibrator, and thus degrade the accuracy of a clock controlled by that frequency.

SUMMARY OF THE INVENTION

According to the invention, the base of a planar type vibrator is attached to a mounting surface by a tension member extending through the base of the vibrator. The opening in the base, and the tension member are preferably relatively so shaped that the vibrator is controlled against rotation around the tension member. An elastomeric pad is interposed between the base and the mounting surface, and is provided with a curved surface adjacent to the base, such that the amount of surface of the pad engaging the base varies with the degree of compression between the base and the pad.

DESCRIPTION OF THE DRAWING

A preferred embodiment of the invention is shown in the accompanying drawing, in which.

DESCRIPTION OF THE PREFERRED EMBODIMENT

Figure 1:
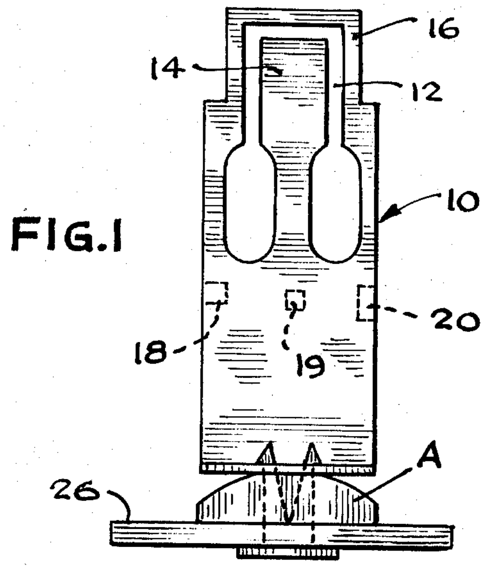
FIG. 1 is an elevational view of a planar vibrator mounted in accordance with the invention.

The invention is suitable for use with a planar vibrator of the type indicated generally at 10. The vibrator 10 is formed from a relatively thin strip of a suitable metal by punching out or otherwise removing a generally U-shaped portion, leaving the opening 12. The vibrator thus has an inner tine 14 and an outer tine 16; the upper extremities of these tines can be caused to vibrate by any of various means known to the art, one means being by the affixing of piezoelectric elements 18, 19 and 20 to the vibrator in the region below the opening 12. These elements are coupled to a suitable electronic circuit (not shown) by which vibrator 10 is maintained in continuous oscillation, with the flexion of tines 14 and 16 taking place in a direction generally perpendicular to the plane of the paper in FIG. 1. The normal and desired mode of vibration is known as "fork mode," in which the tines move alternately in opposite directions. One phase of such a vibratory movement is illustrated in dotted lines in FIG. 2. The piezoelectric elements or other pickup and driving devices and the associated electronic circuit are arranged to cause this mode of vibration, and a signal at the resonant frequency at which this vibration takes place can be taken as an output from the electronic circuit to actuate frequency-dependent devices as desired.

However, the vibrator 10 is potentially resonant in other ways, and may, for example, vibrate in what is called the "reed mode," in which the tines move simultaneously in the same direction, as if they were joined at their outer extremities. Such vibration is undesired, because the resonant frequency for this mode is not the same as the resonant frequency for fork mode vibration, and introduces unwanted components into the signal output of the electronic circuit controlled by the vibrator. Such components may degrade the accuracy of a device dependent on the frequency of the signal output.

The vibrator and the electronic circuitry associated with it can be advantageously used to provide a controlled frequency signal for the operation of an automobile clock. It will be obvious, however, that when the device is used in an automobile it is subject to random shocks and to vibrations of various frequencies, changing with changes in engine and car speeds. Some of these external forces, if transmitted to the vibrator, will excite it into the undesired reed mode of oscillation, and thus will contribute to inaccuracy in the operation of the clock.

The present invention provides a mounting for the vibrator which has been found to provide a high degree of isolation from such external forces.

Figure 3:
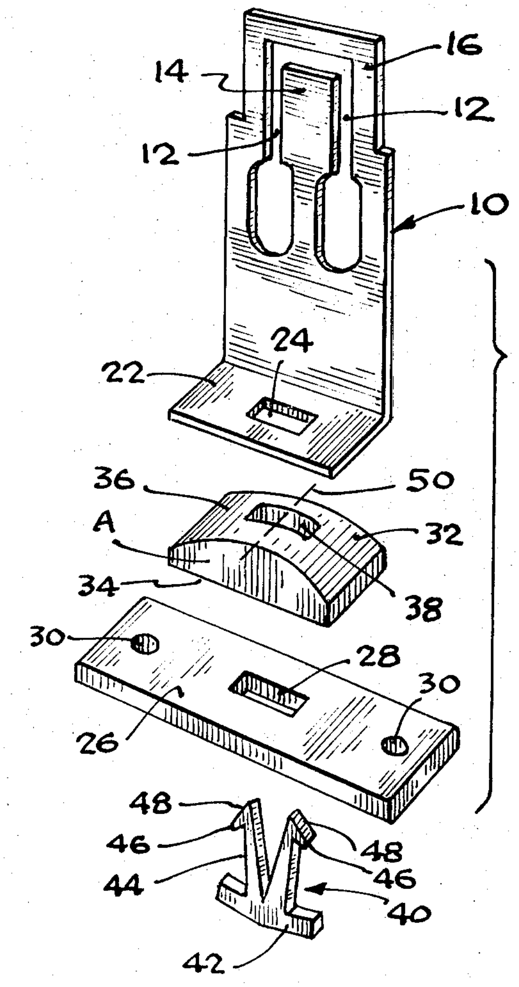
FIG. 3 is a perspective exploded view of the elements comprising the mounting.

The base portion of the vibrator may be formed at right angles to the plane of the tines to constitute a foot 22, which has a hole 24 formed in it. The hole is shown in FIG. 3 as rectangular, but any non-circular form may be used as a means of preventing rotation about the fastening device. A support member 26 is provided with a similar hole 28 for the converse reason, and optionally with additional holes 30 through which fasteners may be passed to attach the support member to other parts associated with the vibrator. The support member 26 may be a printed circuit board, carrying the elements of the oscillator circuit used with the vibrator.

A pad 32 of elastomeric material is interposed between the member 26 and the vibrator foot 22. This pad has a flat surface 34 adjacent to the member 26, and a curved surface 36 adjacent to the foot 22. At its thickest point, the pad 32 has a rectangular hole 38.

A fastening device 40 passes through holes 28, 38 and 24, and retains the parts in assembled relation under tension, so that pad 32 is somewhat compressed. The invention is not limited to any particular type of fastening device, but the drawing illustrates a fastener which has advantages of economy and convenience. It may be molded from any suitable tough and non-rigid plastic material, and includes a head 42, and bifurcated arms 44 terminating in barbed ends 46 having inclined surfaces 48 which force the arms together somewhat as they enter the holes 28, 38 and 24, so that the barbed ends 46 move outwardly as they pass through the last hole, and engage the upper surface of foot 22. The length of the arms 44 between the opposing surfaces of the head 42 and of the barbed ends 46 is so proportioned with reference to the total thicknesses of the member 26, the pad 32, and the foot 22 that the pad must be compressed somewhat at the time of assembly in order for the barbed ends of the fastening device 40 to pass completely through and engage the upper surface of foot 22.

As an example of a specific embodiment, the structure described has been used with a vibrator 31 mm high, 12 mm wide, and 0.25 mm thick, with a foot extending 6 mm at a right angle to the main plane of the vibrator. The pad is in the form of a plano-cylindrical prism, the cylindrical side being circular in curvature, having a radius of 9.5 mm, and the plane side having dimensions of 9 mm (in the direction of the cylinder axis) by 12 mm. The maximum thickness is 3.3 mm, about one-third of the cylinder radius. The pad is made of neoprene rubber, and a hardness in the range of 30 to 50 durometer has been found effective. The compression on assembly is in the range of 0.25 to 0.50 mm, or about 2.5 to 5 percent of the cylinder radius.

For the utilization of this invention, in this specific embodiment it is important to note the proper orientation of the cylindrically curved pad. Stated in general terms, the requirement is that a generatrix of the cylindrical surface (represented by the dash line 50 in FIG. 3) in the area of contact between the pad 32 and the foot 22 must extend in such a direction that the pad at opposite ends of the generatrix is alternately compressed (in addition to the assembly compression) by a vibratory excursion of the plate 26 which tends to excite the tines 14 and 16 to reed mode vibration.

Figure 2:
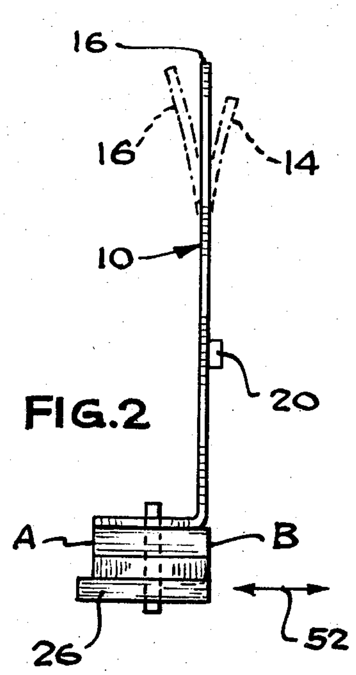
FIG. 2 is a side view of the structure shown in FIG. 1.

For example, a vibratory movement of the member 26 in the direction of the double arrow 52 in FIG. 2 (in the plane of the member 26) is required to excite the tines into reed mode vibration. Because of the bell-crank effect of the foot 22, the foot is rocked about the fastening device 40, and alternately compresses side A and side B of the pad, or, in terms of the statement made above, alternately additionally compresses the pad at opposite ends of the generatrix 50.

Figure 4:
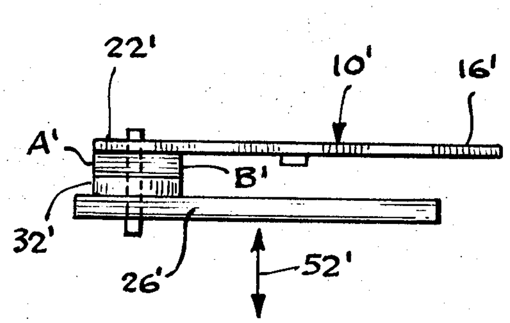
FIG. 4 is a side view showing a modified form of the structure.

However, for economy of space, or because of the directional orientation of troublesome external vibrations, it may be desired to use the modified form shown in FIG. 4, in which the tine portion 16' of the vibrator 10' and the mounting portion 22' thereof are not mutually perpendicular, but lie in a common plane. In this structure, a vibratory movement of the member 26' in the direction indicated by the double arrow 52' would be required to excite the tines into reed-mode vibration, yet still with the effect previously described, to compress sides A' and B' of the pad 32' alternately, in addition to the assembly compression.

The effect in either case is that the rubber in the area along the surface curve generatrix 50 between the hole 38 and the side A or B being further compressed at a particular instant must "flow" laterally to some extent. This involves both internal molecular friction, and friction of the rubber against the adjacent surface of the foot 22. Because of the lossy nature of this compression, and the fact that it is cyclical, two results follow. The first is that movement of the member 26 is relatively ineffective in setting the vibrator into fork-mode vibration, which is to say that the vibrator is to a considerable degree isolated from external vibration tending to excite it in fork mode. The second result is that such vibration as does occur is highly damped, i.e., decays very rapidly upon removal of the exciting force, or change of its frequency outside the range of reed mode resonance.

Because the principles of this invention apply to either of the forms just described, the term "base" is used in the accompanying claims as inclusive of a mounting foot such as 22, perpendicular to the plane of the vibrator, or a mounting portion such as 22', lying in a plane common to that of the vibrator.

The non-circular conformation of holes 24, 28 and 38, in cooperation with the corresponding cross-section of fastener 40 minimizes any tendency of the parts to rotate with respect to each other, and maintains them in the proper relation as described.

In more general terms, the invention is appropriate for application in many situations where it is desired to minimize the transmission of vibratory movement from one member to another. It may be utilized, for example, where vibratory motion originates in a machine, which should not be transmitted through the machine mounting. Or, on the other hand, a support member may at times be subject to vibratory movement which must not be communicated to a machine or instrument supported thereon.

Usefulness is not limited to the specific case described in which vibration in a particular direction is of concern, but may be more general, in which case the curved surface need not be cylindrical, but may be of compound curvature. Furthermore, the intersection of the curved surface and the plane surface may be provided by a reversal of the form described, i.e., the elastomeric pad may be flat on both sides, with the curved surface formed on either the support member, or on the base of the supported device which comes in contact with the pad, or both.

The extent of compression of the pad upon assembly should be sufficient to assure that under the worst case of tolerance stack-up of the associated parts there would still be pressure contact of all parts, plus enough so that the parts are still in contact under the maximum excursion of compression likely to be encountered in the oscillatory compression of the pad. Suitable hardness of the rubber will vary with the amount of excursion allowable, the size of the pad, the weight of the supported device, and the range of vibration frequencies involved.

The aspects of the invention in which an exclusive property or privilege is claimed are defined as follows:

1. Means for attaching to a support member a mechanical vibrator of planar type having at one end thereof two tines adapted to vibrate in a direction normal to the vibrator plane and having at the other end a base portion, said means comprising an elastomeric pad interposed between said base portion and said support member, and a fastener extending from said support member through said pad and through said base portion, said means characterized by one of the adjacent surfaces of said pad and said base portion being cylindrical, with a generatrix of said cylindrical surface extending through said fastener, and said adjacent surfaces being increasingly spaced from each other at increasing distances from said generatrix, said generatrix lying in the same plane as the direction of vibratory movement of the tines of said vibrator when excited in reed mode.

2. The attaching means of claim 1, wherein said cylindrical surface is of circular section, and said fastening means compresses said pad in an amount in the range of 2.5 to 5 per cent of the radius of said circular section.

3. The attaching means of claim 2, wherein said pad has a thickness of approximately one-third of the radius of said circular section.

4. The attaching means of claim 1, wherein said pad is of neoprene rubber with a hardness in the range of 30 to 50 durometer.

5. Means for attaching a mechanical vibrator to a support member, where said mechanical vibrator is of the type having at one end thereof two tines lying in a common plane at rest and vibrating in a direction normal to said plane, and having a base portion at the other end thereof, said means comprising an elastomeric pad interposed between said base portion and said support member, and fastening means extending from said support member through said pad and said base portion and holding said base portion in compression against said pad, characterized by the adjacent surfaces of said pad and said base portion being one flat and the other curved, said curved surface being cylindrical, with a generatrix of said cylindrical surface extending through said fastening means, and said cylindrical surface being so oriented that said generatrix lies in a common plane with the direction of vibratory movement when said vibrator is excited in reed mode.

6. The attaching means of claim 5, wherein said fastening means is of non-circular cross-section, and passes through holes of matching non-circular shape in said pad and said vibrator, whereby the relative orientation of said pad and said vibrator around said fastening means is maintained.

7. Means for attaching a mechanical vibrator to a support member, where said mechanical vibrator is of a type having vibrating tines at one end thereof and a flat base portion at the other end thereof, said means comprising an elastomeric pad having a length dimension and having a thickness varying from a minimum at one end of the length thereof, to a maximum at a mid point thereof, and to a minimum again at the opposite end thereof, but of uniform thickness across any section taken transversely to the length thereof, said pad being interposed between said base portion and said support member, and a fastening means extending from said support member through said pad at its maximum thickness, and through said base portion, maintaining said base portion and said pad in pressure contact and adapted to prevent relative rotation of said vibrator around said fastening means with respect to said pad, whereby said pad and said base portion are maintained in relative orientation such that the direction of movement of the tines of said vibrator in reed mode is parallel to a plane transverse to the length of said pad.

8. The attaching means of claim 7, wherein said fastening means is of non-circular cross-section, and passes through holes of matching non-circular shape in said pad and said vibrator, whereby the relative orientation of said pad and said vibrator around said fastening means is maintained.

* * * * *